US011578228B2

(12) United States Patent
Twardowska et al.

(10) Patent No.: US 11,578,228 B2
(45) Date of Patent: *Feb. 14, 2023

(54) FILLER COMPOSITION INDICATING READINESS TO SAND (71) Applicant: ILLINOIS TOOL WORKS INC., Glenview, IL (US)

(72) Inventors: Helena Twardowska, Cincinnati, OH (US); Andrew Schirmer, Cincinnati, OH (US)

(73) Assignee: Illinois Tool Works Inc., Glenview, IL (US)

( * ) Notice: Subject to any disclaimer, the term of this patent is extended or adjusted under 35 U.S.C. 154(b) by 521 days.

This patent is subject to a terminal disclaimer.

(21) Appl. No.: 16/037,242

(22) Filed: Jul. 17, 2018

(65) Prior Publication Data
US 2019/0023931 A1 Jan. 24, 2019

Related U.S. Application Data (60) Provisional application No. 62/534,486, filed on Jul. 19, 2017.

(51) Int. Cl.
| C09D 17/00 | (2006.01) |
| C09D 4/06 | (2006.01) |
| C08F 283/01 | (2006.01) |
| C09D 5/34 | (2006.01) |
| C09D 5/00 | (2006.01) |
| C09D 7/41 | (2018.01) |
| C09D 167/06 | (2006.01) |
| C09D 167/08 | (2006.01) |
| B05D 3/10 | (2006.01) |
| B05D 3/12 | (2006.01) |
| B05D 5/06 | (2006.01) |
| B05D 7/14 | (2006.01) |
| B62D 29/00 | (2006.01) |
| C09D 167/00 | (2006.01) |
| B05D 1/34 | (2006.01) |
| B05D 5/00 | (2006.01) |
| C08K 3/22 | (2006.01) |
| C08K 5/14 | (2006.01) |

(52) U.S. Cl.
CPC ........... *C09D 17/008* (2013.01); *B05D 3/108* (2013.01); *B05D 3/12* (2013.01); *B05D 5/06* (2013.01); *B05D 7/14* (2013.01); *B62D 29/007* (2013.01); *C08F 283/01* (2013.01); *C09D 4/06* (2013.01); *C09D 5/00* (2013.01); *C09D 5/34* (2013.01); *C09D 7/41* (2018.01); *C09D 167/00* (2013.01); *C09D 167/06* (2013.01); *C09D 167/08* (2013.01); *B05D 1/34* (2013.01); *B05D 5/005* (2013.01); *B05D 2202/00* (2013.01); *B05D 2202/15* (2013.01); *B05D 2203/30* (2013.01); *C08K 3/22* (2013.01); *C08K 5/14* (2013.01); *C08K 2003/2241* (2013.01)

(58) Field of Classification Search
CPC .. C09D 17/008; C09D 17/003; C09D 17/001; C09D 17/002; C09D 167/00; C09D 167/06; B05D 3/108; B05D 3/12; B05D 5/06; B05D 5/065; B05D 7/14; B05D 2508/00; B62D 29/00; C08K 3/22; C08K 5/0041; C08K 5/23
See application file for complete search history.

(56) References Cited

U.S. PATENT DOCUMENTS

| 3,382,296 | A | | 5/1968 | Tenquist et al. |
| 4,370,428 | A | | 1/1983 | Danville |
| 4,522,963 | A | | 6/1985 | Kecskemethy et al. |
| 4,740,566 | A | * | 4/1988 | Tremper, III ........ C09D 161/20 523/400 |
| 5,583,178 | A | * | 12/1996 | Oxman .................... A61K 6/20 524/718 |
| 5,721,011 | A | * | 2/1998 | Bastow .................... B05D 5/06 427/277 |
| 6,482,474 | B1 | * | 11/2002 | Fenn .................... C09D 175/04 427/385.5 |
| 10,233,307 | B2 | * | 3/2019 | Schulz ................ C09B 29/0829 |
| 2006/0202158 | A1 | | 9/2006 | Chen et al. |
| 2013/0004663 | A1 | | 1/2013 | Adams et al. |
| 2016/0041143 | A1 | | 2/2016 | Wendland et al. |
| 2018/0016435 | A1 | | 1/2018 | Adams et al. |

FOREIGN PATENT DOCUMENTS

| JP | S59120612 A | 7/1984 |
| WO | 2018111757 A1 | 6/2018 |

OTHER PUBLICATIONS

International Search Report dated Oct. 30, 2018 for International Application PCT/US2018/042483 filed Jul. 17, 2018.

* cited by examiner

*Primary Examiner* — Jane L Stanley
(74) *Attorney, Agent, or Firm* — Blue Filament Law PLLC (57) ABSTRACT

A vehicle bond filler formulation is provided that includes a part A having curable resin and a monomer reactive diluent. A part B storage-separate, cure initiator package contains a free-radical cure initiator. At least one color changing dye adapted to change color upon mixing the part A and the part B and within ±5 minutes of cure of the curable resin to a sandable condition is present in either the part A or a separate part C, a guide coat colorant, or a combination thereof. A process of for repairing a vehicle body is also provided that includes mixing a part A containing the at least one color changing dye with the part B to form an internal guide coat mixture applied to a substrate of the vehicle body in need of repair. The mixture cures causing the color changing dye to the terminal change color within ±5 minutes of cure of the curable resin to a sandable condition.

19 Claims, 11 Drawing Sheets
(11 of 11 Drawing Sheet(s) Filed in Color)

FILLER COMPOSITION INDICATING READINESS TO SAND

RELATED APPLICATIONS

This application is a non-provisional application that claims priority benefit of U.S. Provisional Application Ser. No. 62/534,486 filed Jul. 19, 2017; the contents of which are hereby incorporated by reference.

FIELD OF THE INVENTION

The present invention in general relates to a curable filler composition and in particular, to such a composition that changes color to reflect the level of cure.

BACKGROUND OF THE INVENTION

Free radical curable resins have been used in varied applications, such as in polyester vehicle body filler compositions and glass reinforced polyester vehicle body filler compositions used in the automotive body repair field. A common problem encountered in working with such free radical curable resin vehicle body filler compositions is their poor adhesion to various substrates used to form vehicle body panels and other vehicle parts. Another common problem encountered in working with such vehicle body filler compositions is the time-consuming process required to detect low spots or other imperfections on a vehicle body during the filler sanding process.

In the case of hot dipped galvanized substrates, the poor adhesion problem in vehicle body filler compositions presents itself when determining when a cured composition has hardened (or synonymously referred to in the field and herein as having "dried") to an extent needed to allow for sanding of the cured filler composition. While premature attempts to sand a cured partially-hardened composition lead to displacement of curing filler material from a desired location that often requires reapplication of uncured filler composition, waiting too long to assure complete cure to hardness slows repair throughput and can allow for moisture absorption that can negatively affect the longevity of a subsequently applied paint coating through mechanisms such as paint blistering. Furthermore, premature attempts to sand a cured partially-hardened composition result in poor featheredge and clogging of sandpaper. Determining the appropriate time to sand a recently cured filler composition within the desired window of hardness is further complicated by differential rates of cure as a function of variables that illustratively include ambient temperature, quality of polymerization initiator mixing, thickness of the curing composition, and spatial inhomogeneities in cure conditions.

Conventional techniques to control the temporal window for sanding have included the use of heat lamps to speed cure and erring on the side of excess delay. Unfortunately, such lamps are expensive to purchase and operate and still rely on a level of subjective judgment as to when the desired window of sandable hardness has been achieved. At present, dry to sand time is typically determined by a technician who is frequently touching the repair surface and evaluating softness and tackiness of the repair mixture. It is subjective and cumbersome as the composition may stick to the technician's fingers, especially at early stages of cure. As noted above, this may result in displacement of curing filler material from a desired located that often requires reapplication of uncured filler composition, causing the repair process to become more inefficient and time-consuming.

Regarding the detection of low spots or other imperfections during the filler sanding process, conventional techniques generally require a separate step which involves the application of a separate commercial guide coat product on the surface of the repair. This separately added commercial guide coat reveals the presence of any low spots or other imperfections, indicating that further sanding is necessary to remove these low spots or other imperfections. Unfortunately, this added step requiring separate application of commercial guide coat results in a less efficient repair process and a longer repair time.

Thus, there exists a need for a free radical curable filler composition that is capable of providing a colorimetric change when a filler composition is amenable to sanding. There also exists a need to detect colorimetrically when a filler composition has been sanded to the point of complete removal of low spots or other imperfections on a vehicle body.

SUMMARY OF THE INVENTION

A vehicle bond filler formulation is provided that includes a part A having curable resin with a degree of unsaturation; and a monomer reactive diluent in which the curable resin is dissolved or suspended. A part B, storage separate free-radical cure initiator package is included that contains a free-radical cure initiator. At least one color changing dye is included that is adapted to change color upon mixing of the part A and the part B, a terminal color change occurring within ±5 minutes of cure of the curable resin to a sandable condition, the at least one color changing dye being present in either the part A or a separate part C.

A process for repairing a vehicle body is also provided that includes mixing a part A polyester resin formulation containing a curable resin having a degree of unsaturation, a monomer reactive diluent in which the curable resin is dissolved or suspended; with a part B storage separate free-radical cure initiator package comprising a free-radical cure initiator to form a mixture. At least one color changing dye that changes color during cure is present in the mixture. The mixture is then applied to a substrate of the vehicle body in need of repair. The mixture is cured to form a fill to repair the vehicle body under conditions adapted to cause the at least one color changing dye to change color observable within ±5 minutes of cure of the curable resin to a sandable condition. The fill is then sanded. Through the addition of a guide coat colorant that changes color based on ambient air exposure, confirmation that no low spots or other imperfections remain on the vehicle body is achieved by sanding the fill until no color remains associated with the air reacted guide coat colorant.

BRIEF DESCRIPTION OF THE DRAWINGS

The patent or application filed contains at least one drawing executed in color. Copies of this patent or patent application publication with color drawing(s) will be provided by the Office upon request and payment of the necessary fee. FIG. 1A—4 min, FIG. 1B—11.5 min, FIG. 1C—18 min, FIG. 1D—21 min, FIG. 1E—26 min, FIG.

1F—31 min, FIG. 1G—38 min, FIG. 1H—42.5 min, FIG. 1I—49 min, FIG. 1J—50 min, and FIG. 1K—54 min.

FIG. 2A—11'21 min, FIG. 2B—17'29 min, FIG. 2C—19'08 min, FIG. 2D-20'19 min, and FIG. 2E—25'07 min.

DETAILED DESCRIPTION OF THE PREFERRED EMBODIMENTS

The present invention has utility as a free radical curable resin as an automotive body filler that has a color change corresponding to the progress of the cure process until a dry to sand condition has been attained. The present invention has further utility as an internal guide coat, based on inclusion of a guide that changes color based on exposure to ambient air and as a result, has a different color on the surface of the repair than when in bulk, allowing for the detection and removal of low spots or other imperfections from a vehicle body by additional sanding of the inventive filler to remove oxidized guide coat colorant surface regions. The present invention also has utility as a process for repairing a vehicle body. The internal guide coat colorant changes color when exposed to ambient air to identify low spots in a filled area.

The cure color change is achieved through resort to at least one color changing dye that reacts with a free radical cure initiator during the vehicle body repair process and changes color to indicate when the filler composition has achieved a level of cure so as to be dry enough to sand. The at least one color changing dye is added to a filler and/or putty curable formulation during production. The formulation remains storage stable until mixed with a free radical generating peroxide. The free radicals initiate a crosslinking reaction of curable resin having a degree of unsaturation with a monomer reactive diluent present in the formulation in which the curable resin is dissolved or suspended, resulting in a hardened mixture on the repair area. Dye molecules also react with free radicals and change color during that process, for instance going from red to colorless. The cure color change correlates with completion of a crosslinking reaction and indicates the time when the cured filler is ready for sanding. Dyes that are particularly useful to indicate dry to sand time exhibit one color in an oxidized state, and exhibit a different color when in a reduced state.

The inventive filler also acts as an internal guide coat through resort to the inclusion of a guide coat colorant that reacts to ambient air and as a result, has a different color on the surface of the repair compared to the guide coat colorant in the bulk. Without intending to be bound by a particular theory, the guide coat colorant reacts to oxygen or moisture or room light to change color, the surface reacted color is described herein synonymously as an oxidized color. During the sanding process, low spots or other imperfections remain after an initial sanding that removes the oxidized guide coat colorant from the majority of surface, so as to make low spots visually identifiable as there fill regions in which sanding has not removed the surface oxidized guide coat colorant. This allows a technician to continue the sanding process until complete removal of the color associated with the oxidized guide coat colorant is achieved, further allowing the technician to visually confirm that no low spots or other imperfections remain on the repair.

It is to be understood that in instances where a range of values are provided that the range is intended to encompass not only the end point values of the range but also intermediate values of the range as explicitly being included within the range and varying by the last significant figure of the range. By way of example, a recited range of from 1 to 4 is intended to include 1-2, 1-3, 2-4, 3-4, and 1-4.

The present invention includes the modification of a free radical curable resin formulation to include at least one dye that changes color to mark the progression of cure and in some inventive embodiments, the time when the cured material is suitable for sanding. Substrates to which an inventive formulation are applied illustratively include mild steel, stainless steel, zinc/zinc-aluminum-coated steel, copper, bronze, silicon bronze, tin, aluminum, solder, brass, thermoplastics, and sheet molding compositions. It is appreciated that the present invention is particularly well-suited for the autobody repair industry.

An inventive polyester resin formulation in certain embodiments is based on a polyester resin; however, it is appreciated that other free radical curable formulations operative herein illustratively include acrylics, vinyl esters, and combinations thereof. The free radical curable resin is modified with specialized additives to control the free-radical polymerization so as to minimize cure reaction exothermocity and shrinkage. To further maximize the resulting cured polyester composite toughness and adhesion, in some inventive embodiments, a thermoplastic filler also incorporated.

As used herein, "sandable" with reference of a cured inventive formulation is defined as having limited clogging of sandpaper and able to form featheredge.

As used herein, "terminal color change" is when an evolving color or dissipation of a color has no discernable difference in color to an unaided human eye over ten minutes under constant ambient lighting conditions.

An inventive polyester resin has a degree of ethylenic unsaturation that is between 20 and 100% of the non-alcoholic monomer in the polyester resin and denotes reactivity within the polyester resin backbone to free radical polymerization. The unsaturation in a polyester backbone is reactive with vinyl and allyl moieties of a styrenic or non-styrenic molecule through free-radical polymerization.

In some embodiments, an inventive unsaturated polyester resin is terminally functionalized with molecules illustratively including allyl glycidyl ether, glycidyl methacrylate, trimethylolpropane diallyl ether, allyl pentaerythritol or polymeric allyl glycidyl ether.

An inventive unsaturated polyester is readily formed in a single reaction or in multi-stage reactions. Typical reaction temperatures range from 130-240° C. A conventional esterification catalyst is present and illustratively includes acids, transition metal catalysts and organo-tin compounds. Typical catalyst loadings range from 0.01 to 1 total weight percent of the reactants.

Reactive polyester resins used in a body filler formulation have a weight average molecular average weight ranging from 5,000 to 600,000. For purposes of calculating monomer percent, reactive diluents are omitted. Based polyester resin formulations operative herein are detailed in Table 1.

To form a body filler formulation, the resulting reactive polyester resin is dissolved in a reactive diluent. Reactive diluents operative herein include acrylics, acrylates, and methacrylates such as methyl methacrylate, butyl acrylate, ethyl-hexyl acrylate, hydroxypropyl methacrylate, hydroxethyl methacrylate, lauryl acrylate, stearyl methacrylate, lauryl methacrylate, butanediol diacrylate, ethyleneglycol dimethacrylate, ethyleneglycol-DCPD methacrylate, ethyl (meth)acrylate and n- and isobutyl(meth)acrylate, cyclohexyl(meth)acrylate, isobornyl(meth)acrylate, benzyl(meth) acrylate, butyleneglycol dimethacrylate, diethyleneglycol dimethacrylate, triethyleneglycol dimethacrylate, propyleneglycol dimethacrylate, dipropyleneglycol dimethacrylate, tripropyleneglycol dimethacrylate and trimethylolpropane triacrylate, or DCPD diacrylate; ether monomers of the structure ($C_1$-$C_6$ alkyl)-O—($C_2$-$C_6$ alkylene) such as ethyl vinyl ether, or methyl vinyl; styrene, α-methylstyrene, vinyl toluene, di-functional styrene, allyl substituted benzene, di-vinyl benzene, di- and trifunctional acrylates (commercially available for example as SARTOMER® and MIRAMAR® products), acrylonitrile, mono-vinyl-terminated polydimethylsiloxanes, and combinations of any of the aforementioned. It should be appreciated that a phenyl ring having two moieties in the aforementioned list is intended to include ortho isomers, para isomers, meta isomers, and isomeric mixtures of each.

Additives are present in an inventive formulation to improve at least one property of handling, storage, cure rate, sandability, or substrate adhesion. The additives illustratively include at least one of a thixotropic agent, a pigment, a dye, a suppressant, a filler, an adhesion promoter, an inhibitor, a leveling agent, or a wetting agent.

A thixotropic agent operative in the present invention illustratively include fumed silica, organoclays, inorganic clays and precipitated silica. Multifunctional alcohols are commonly used to enhance thixotropic properties. A thixotropic agent is present from 0 to 10 percent by weight. The thixotropic agent is typically present from 0.1 to 2 total weight percent of a complete formulation for application to a substrate.

A fast pigment or dye operative in the present invention illustratively include titanium dioxide, carbon black, iron oxides, and phthalocyanine blue. These fast pigments and dyes are amenable to dissolution or suspension in the reactive diluent and do not change color during the course of free radical polymerization. A pigment or dye is present from 0 to 10 total weight percent of a complete formulation for application to a substrate. In some inventive embodiments, an unreactive pigment or dye, synonymously referred to herein as a fast pigment or dye is added to the part B to visually show a user when parts A and B have been uniformly mixed. In the following inventive examples, a fast blue pigment is added to the BPO containing part B for this purpose.

A suppressant reduces vapor emissions and in some embodiments enhances cure time. A suppressant operative in the present invention illustratively includes waxes, polyethers, polysiloxanes and various block copolymers. A suppressant is present from 0 to 5 total weight percent of a complete formulation for application to a substrate.

Filler particulates or fibers operative in the present invention illustratively include talc, alumina trihydrate, calcium sulfate, calcium carbonate, magnesium sulfate, magnesium carbonate, barium sulfate, microspheroids and the like. A filler is present from 0 to 60 total weight percent of a complete formulation for application to a substrate. It is appreciated that a pigment and filler can have the same function and in those instances where both are present in a formulation, the amounts of both are cumulative.

As used herein a microspheroid is defined to include a hollow microsphere or a solid bead having an aspect ratio of between two normal maximal linear dimensions of between 1 and 1.6. Typically, a spheroid particle is formed of glass or a thermoplastic material. In some inventive embodiments, the microspheroid is within 10 linear dimension percent of spherical and formed of glass. A microspheroid typically has a longest linear dimension of between 20 and 100 microns to improve sandability and reduce density.

A leveling agent operative in the present invention illustratively includes acrylic resins, fluorocarbons, fluoropolymers and silicones. A leveling agent is present from 0 to 2 total weight percent of a complete formulation for application to a substrate.

A wetting agent operative in the present invention illustratively includes boric acid esters, phosphate esters, fatty acid salts, and polyethers. A wetting agent is present from 0 to 2 total weight percent of a complete formulation for application to a substrate.

An adhesion promoter operative in the present invention illustratively includes silanes, tetrahydrophthalic anhydride. An adhesion promoter is present from 0 to 2 total weight percent of a complete formulation for application to a substrate.

An inhibitor is present to extend shelf storage ability and extend cure time. Cure inhibitors operative herein illustratively include hydroquinone, parabenzoquinone, toluhydroquinone, 4-tert butylcatechol, and metal naphthenates. A cure inhibitor is present from 0.0005 to 1 total weight percent of a complete formulation for application to a substrate.

A resin formulation is typically stored as a part A that includes all components with the exception of a curative package, and a part B containing a curative package that is mixed with the part A immediately before application to the vehicle body substrate. In some inventive embodiments, a resin formulation is stored as a part A that includes all components with the exception of a curative package and a package containing at least one color changing dye. A part B containing a curative package, and a part C containing at least one color changing dye are mixed with part A immediately before application to the vehicle body substrate. It is appreciated that other components with the exception of the polyester resin are also present in the curative package.

The resin compositions of the present invention are cured to react with the reactive diluent by a number of free-radical cure initiators that include organic peroxide, azo-type initiators, electron beam, ultraviolet (UV) light, and combinations thereof. Peroxide initiators operative herein illustratively include diacylperoxides, hydroperoxides, ketone peroxides, peroxyesters, peroxyketals, dialkyl peroxides, alkyl peresters and percarbonates. Azo-type initiators operative herein illustratively include azobisisobutyronitrile (AIBN). Benzoyl peroxide (BPO) is a prototypical free-radical cure initiator. Chemical cure initiators are typically present from 1 to 5 total weight percent of a fully mixed and applied polyester resin formulation. These resin compositions may optionally be cured by UV or electron beam.

At dry to sand ("DTS"), the resulting filler has sufficient bond strength to substrate to render a "featheredge," meaning a smooth and gradual transition from thicker fill at the center of the repair to thinner fill at the edges of the repair, and no tearing or chipping at a perimeter edge of the fill on the substrate. To facilitate detection of this stage of cure, at least one dye is added that has a color change occurring at a time that corresponds to the DTS condition of the resin formulation cure.

It is appreciated that because the cure of a given resin formulation varies as a function of variables that illustratively include filler thickness, ambient air temperature, and cure temperature, the dye specifics as to amount and identity will have to be adjusted to coincide with the DTS condition as a function of variables such as those included in the non-exhaustive list above. Color change dyes operative herein have the attribute of a conjugated ring system having two separate aryl domains with an intermediate unsaturated bond there between of the general formula A-X-A', where A and A' are each independently an aryl moiety $C_6H_5-$, $C_{10}H_7-$, $C_5NH_4-$, $C_4NH_4-$, $C_4N_2H_3-$ and substituted forms thereof in which any given hydrogen is substituted by a $C_1$-$C_4$ alkyl, $C_1$-$C_4$ alkyl primary amine, $C_0$-$C_4$ alkyl phenyl, $C_0$-$C_4$ alkyl hydroxyl, $C_1$-$C_4$ alkyl ester, $C_0$-$C_4$ alkyl sulfonates, or a combination thereof, where X is $N=N$, $C=C$, $C(O)$, $C(N-H)$. Without intending to be bound to a particular theory, the unsaturated central double bond is reactive with free radicals of the resin curative package and is kinetically competitive with unsaturations in the resin and monomer, such that the unsaturated central double bond reacts during cure thereby disrupting the conjugation between groups A and A', resulting in the color created by the conjugation between A and A' disappearing as cure progresses. It is appreciated that A and A' may separately have a color visible, yet so long as the color of A and A' without a pi-bonding conjugation is different than that of A-X-A', then a suitable dye exists for the present invention. According to the present invention azo dyes are particularly suitable owing to the brilliant color of the dyes and variety of commercially available colors. With a $-N=N-$ as the X in an inventive color changing dye, sampling various aryl groups for steric constraint of free radical reaction is a survey exercise. Specific dyes operative in the present invention include: red (FR-1 of United Initiators), those detailed in US2006/0202158, or US2016/041143; blue—(Oil Blue A of Greenville Colorants L.L.C.); and yellow/orange: dimethylamino-azobenzene (DAB), methylamino azobenzene (MAB) aminoazobenzene (AAB), 4-hydroxyazobenzene, dimethylamino-azopyridine, and substituted forms thereof in which any given aryl-hydrogen is substituted by a $C_1$-$C_4$ alkyl, $C_1$-$C_4$ alkyl primary amine, $C_0$-$C_4$ alkyl phenyl, $C_0$-$C_4$ alkyl hydroxyl, $C_1$-$C_4$ alkyl ester, $C_0$-$C_4$ alkyl sulfonates, or a combination thereof. It is appreciated the carboxy-DABs, such as 2'- or 4'-carboxy-DABs, and the methyl esters thereof are red in color.

Overcoming the unique issues related to the above-mentioned wide-ranging repair conditions using color changing dyes that react with radicals during the car repair process and change color to indicate dry to sand time of the repair mixture is the basis for present invention. The ability to visually confirm achievement of DTS time via color change reduces technician subjectivity, increases repair efficiency and quality while simultaneously decreasing both repair time and cost. This use environment has proven particularly challenging owing the lack of control over cure environment and repair conditions and the demands for high throughput. The at least one color changing dye is added to filler and/or putty during production. The composition remains stable until mixed with the free-radical cure initiator when radicals are formed. The radicals initiate crosslinking reaction of resin (unsaturated polyester) with monomer, typically styrene, resulting in hardened mixture on the repair area. Molecules of at least one color changing dye also react with radicals and change color during that process, for instance going from red to colorless. As a result, at least one color changing dye serves to show visually when a Part A and Part B are well mixed, and then through a change in color, the attainment of DTS status. The color change correlates with completion of crosslinking reaction and indicates the time when the mixture is DTS. Color changing dyes that are particularly useful for DTS time determination exhibit one color in an oxidized state and exhibit a different color in a reduced state. Thinner edges are particularly useful to indicate time to sand as they cure last because of larger heat losses than from areas in the middle of the repair site. A color changing dye is present from 0.00005 to 0.002 total weight percent of the active dye in a complete formulation for application to a substrate with the specific amounts being informed by the following examples that illustrate the rate of color change as a function of temperature and the amount of free-radical cure initiator. It is appreciated that this dye amount is typically added as a dilute solution as detailed in Table 1.

In some inventive embodiments, a color changing dyes are present in an inventive formulation for application to a substrate with the specific amounts being informed by the following examples that illustrate the rate of color changes as a function of temperature and the amount of free-radical cure initiator and a second dye creates a guide coat. It is appreciated that the inclusion of at least two color changing dyes into the inventive formulation allows for increased flexibility in matching the reactivity of the color changing dyes with free radicals that correlates with DTS time of the repair mixture under various repair conditions. By way of non-limiting example, the inclusion of at least two color changing dyes allows for the selection of at least one color changing dye with a longer residence time before changing from color to colorless, or from one color to another, and at least one color changing dye with a shorter residence time before changing from color to colorless, or from one color to another. Through titration of the relative amounts of each color changing dye in the inventive formulation, matching the reactivity of the color changing dyes with free radicals that correlates with the DTS time of the repair under various repair conditions is made easier. It is appreciated that the amount of free radical initiator can also be controlled to match the reactivity of the color changing dyes with free radicals that correlates with the DTS time of the repair under various conditions. It is further appreciated that the at least two color changing dyes may titrated to be present in amounts that signal, with multiple colors, the achievement of DTS relative to ambient temperature.

Color change of the cure reactive dye occurs in some inventive embodiments with resort to an unaided, normal human eye. While the color changes of the cure reactive color changing dyes is readily detectable with a laboratory ultraviolet-visible (UV-VIS) spectrum spectrophotometer, this equipment is uncommon in a vehicle repair shop. However, a color change associated with cure is readily detected by collecting a digital color photograph that can be analyzed by software based on the known spectra of the fill in uncured and fully cured states containing a given color changing dye package, even if not discernable by an unaided normal human eye. The analysis software operating on a remote computer accessed via the Internet or an intranet, or a device such as a tablet or smart phone used to collect the digital photograph. It is appreciated that such software can predict cure time based on analysis of two or more photographs of the same fill that vary as a function of time.

In other inventive embodiments, a guide coat colorant is present that helps detect low spots or other imperfections on the repair site. Dyes that are particularly useful to form an inventive internal guide coat formulation form a different color on the surface of the formulation than either color of the cure reactive dye. The guide coat colorant color change is triggered by presence on the surface of the fill and is illustratively achieved by the reaction dye molecules in proximity to the fill surface of the formulation with oxygen from air, moisture from air, or light exposure. Guide coat colorants operative herein illustratively include copper (II) salts, such as chlorides, sulfates, nitrates; resorcin; methylene blue, ferricyanides, silver nitrate. It is appreciated that guide coat colorant include resin soluble molecules (dyes) and insoluble materials (pigments). Owing to reactivity with air or room light found in a repair setting, the guide coat colorant changes color. With reference to the following examples in which methylene blue is utilized for this purpose, the guide coat dye is blue on the oxidized surface of the repair while the bulk color of methylene blue is significantly lighter, being a light off-white color. It is appreciated that speed of the color changing reaction is important in order to develop a guide coat during cure of the inventive formulation and should be on the order of the DTS time. It is further appreciated that good contrast between surface and bulk colors aid in detection of low spots or other imperfections on the repair site. During sanding of the repair site, bulk color of the guide coat is uncovered and low spots which still have surface color become apparent. Existence of surface color indicates the need for continued sanding of the repair site. Confirmation that no low spots remain on the vehicle body is achieved by sanding the repair site until no more surface color is detectable by the unaided, normal human eye. It is appreciated that inclusion of an internal guide coat into the inventive formulation dispenses with the need for an additional step requiring application of a separate commercial guide coat onto the repair site, thereby shortening repair time, improving efficiency, and reducing the cost of the repair process.

Cure reactive color change dye provides more accurate method to determine time to start sanding, resulting in better quality of repair, especially at the featheredge, where the fill thickness thins to create a common surface plane with the repair and practically allows multiple repairs to be performed in parallel by watching color changes of each repair. Also, it provides visual indication of potential problem with the repair, for instance if the amount of catalyst is too small the color change will not be complete, indicating an incomplete cure and the need to revisit the repair.

It is appreciated that both features of this invention—the internal guide coat and color change to indicate DTS time—are totally independent and may be used separately or combined for maximum benefit. It is further appreciated that the color changing dyes operative herein can also be used with primers to determine DTS time and develop internal guide coat.

The present invention is further described with respect to the following non-limiting examples. These examples are intended to illustrate specific formulations according to the present invention and should not be construed as a limitation as to the scope of the present invention.

Example 1

Compounding of First Inventive Formulation

TABLE 1

Composition of Vehicle Fillers Containing Cure Reactive Red Dye - Part A

| Chemical | Weight % |
| --- | --- |
| UPE Resin 20-60% unsaturation | 28-35 |
| UPE Resin modified with fatty acids | 7-35 |
| Reactive diluent | 3-5 |
| Cure Reactive Red Dye 2.5% solution | 0.2-0.6 |
| Microspheres | 4-7 |
| Rheological: organoclay | 0.2-0.5 |
| Wetting agent: alkylammonium salt of an acidic copolymer | 0-2 |
| Promoter: tertiary amine | 0.03-0.5 |
| Pigment paste | 0.1-1 |
| Inhibitor: reacted benzoquinone | 0.01-0.5 |
| Styrene suppressant: paraffin wax | 0.03-0.05 |
| Moisture scavenger: aliphatic anhydride | 0-0.8 |

| Fillers/pigments | Remainder such as: |
| --- | --- |
| Pigment: $TiO_2$ | 0-6.0 |
| Calcium carbonate: 0.5-15 micron | 0-40.0 |
| Talc 1: 0.5-10.0 micron | 0-10.0 |
| Talc 2: 10-20 micron | 0-40.0 |

80 ppm of red reactive dye is admixed into the part A, resulting in pink color. Part B contains 50% by weight BPO and small amount of not reactive blue dye to show mixing with Part A. Part B is added to Part A in the amount 2 or 3 total weight percent based on Part A. As a result, after initial mixing of parts A and B, the color is purple and the final color is light blue (from blue pigment in BPO after fading pink to colorless during cure).

Example 2

Compounding of Second Inventive Formulation

The process of Example 1 is repeated with SF resin in place of RU 64. SF is slower than RU 64 body filler, under like cure conditions, it takes 30% more time to complete color change and cure, compared to RU 64 body filler, but otherwise behaves the same.

Example 3

Low Temperature Cure as a Function of Cure Initiator Loading

FIGS. 1A-1K are photographs of a silicon bronze panel with the polyester based filler composition containing a free-radical fading red dye mixed of EXAMPLE 1 with 2 weight percent fully formulated benzoyl peroxide cure initiator (BPO). The temperature was held at between 9.4-11.7 degrees Celsius. The times are in yellow superimposed on each panel. At 31 minutes, lighter purple started but color change is never complete, indicating not enough catalyst and poor not complete cure.

FIGS. 2A-2E are photographs of the same silicon bronze panel with the same polyester based filler composition containing a free-radical fading red dye mixed with 3 total weight percent fully formulated BPO with the temperature held at between 9.4 and 11.7 degrees Celsius. The times are in yellow superimposed on each panel. The color change is essentially complete at 20 minutes, except edges. At 25 minutes the edges are not pink and sample sanded well.

Example 4

Effect of Cure Temperature

Figure 1A:
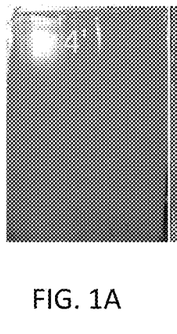
FIGS. 1A-1K are photographs of a silicon bronze panel with a polyester based filler composition containing a red dye that fades in color under free radical cure conditions as a part A mixed with 2 total weight percent fully formulated benzoyl peroxide cure initiator as a part B with the temperature held at between 9.4 and 11.7 degrees Celsius (° C.). The time is superimposed in yellow on each panel in minutes.
Figure 1B:
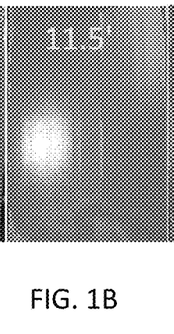
Figure 1C:
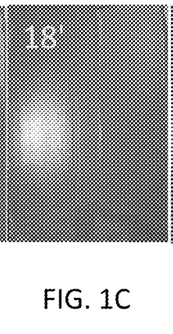
Figure 1D:
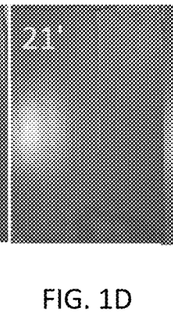
Figure 1E:
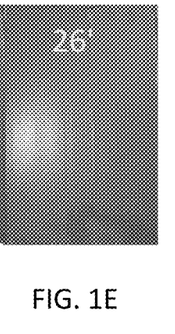
Figure 1F:
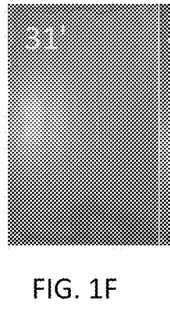
Figure 1G:
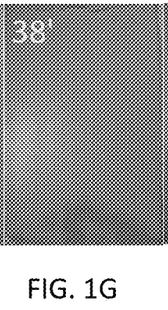
Figure 1H:
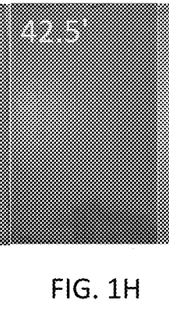
Figure 1I:
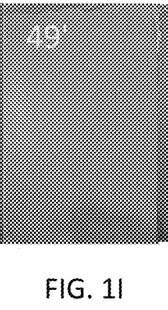
Figure 1J:
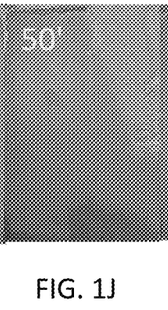
Figure 1K:
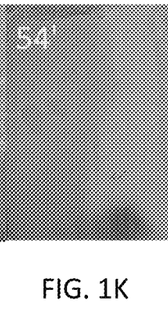
Figure 2A:
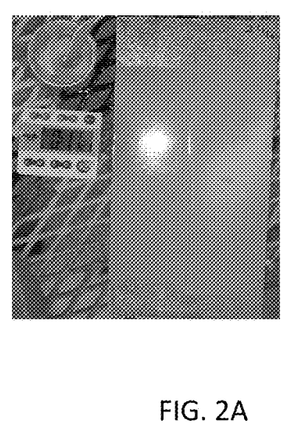
FIGS. 2A-2E are photographs of a silicon bronze panel with a polyester based filler composition, denoted as RU 64 containing a free-radical fading red dye as part A mixed with 2 total weight percent fully formulated benzoyl peroxide cure initiator (BPO) as a part B with the temperature held at between 9.4° C. and 11.7° C. The time is superimposed in yellow on each panel in minutes.
Figure 2B:
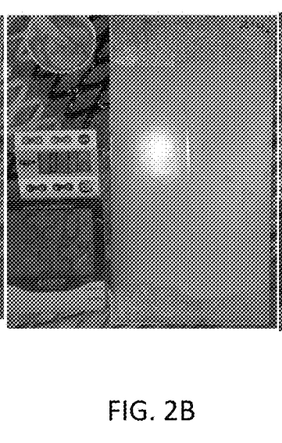
Figure 2C:
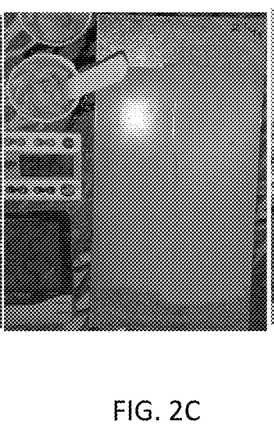
Figure 2D:
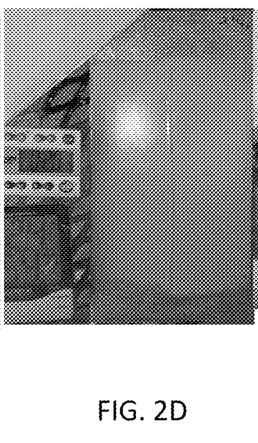
Figure 2E:
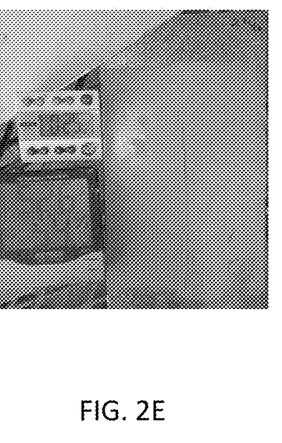
Figure 3A:
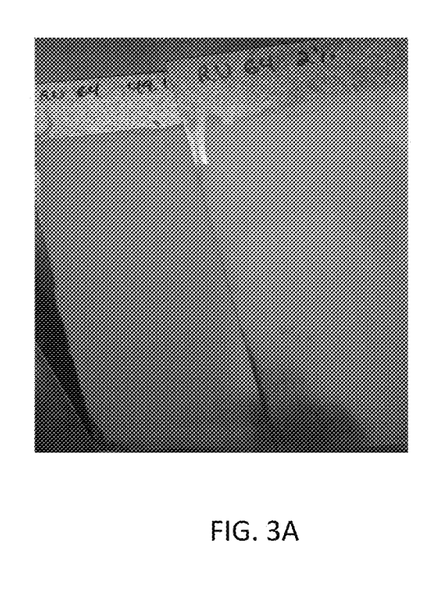
FIG. 3A is a photograph showing the difference between the final color of a given a polyester based filler composition, RU 64 application done at 9.4° C. (left) and at 20° C. (right) with the dye of FIGS. 1A-1J and 2 total weight percent BPO in both.

FIG. 3A is a photograph showing the difference between the final color of a given a polyester based filler composition, RU 64 application done at 9.4° C. (left) and at 20° C. (right) with the dye of FIGS. 1A-1K and 2 total weight percent BPO in both.

Figure 3B:
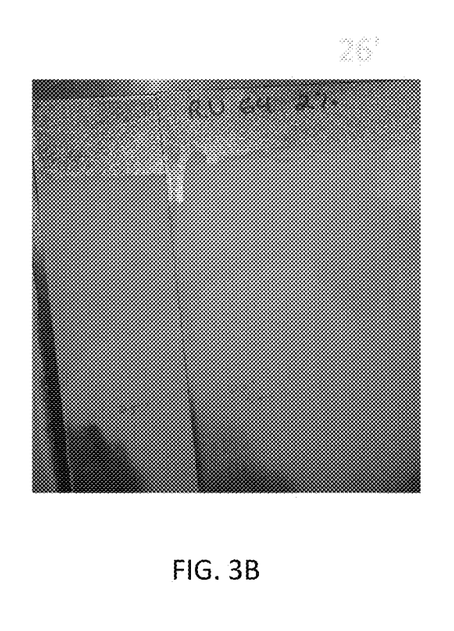
FIG. 3B is a photograph showing the difference between the final color of RU 64 application done at 9.4° C. (left) containing 3 total weight percent BPO and at 20° C. (right) containing 2 total weight percent BPO with the dye of FIGS. 1A-1J. The 3% BPO is noted to be closer to the 20° C. color than the 2 total weight percent BPO shown in FIG. 3A cured at 9.4° C.

FIG. 3B is a photograph showing the difference between the final color of RU 64 application done at 9.4° C. (left) containing total weight percent BPO and at 20° C. (right) containing 2 total weight percent BPO with the dye of FIGS. 1A-1K. The 3 total weight percent BPO is noted to be closer to the 20° C. color than the 2 total weight percent BPO shown in FIG. 3A cured at 9.4° C.

Figure 4A:
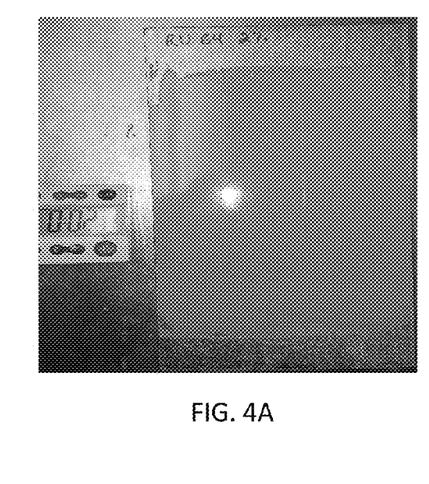
FIGS. 4A-4D are photographs of a silicon bronze panel with a polyester based filler composition, RU 64 containing a free-radical fading red dye as part A mixed with 2 total weight percent BPO as part B with the temperature held at 20° C. as a function of time: 2'31 min (FIG. 4A), 7'05 min (FIG. 4B), 9'38 min (FIG. 4C), and 16'30 min (FIG. 4D).
Figure 4B:
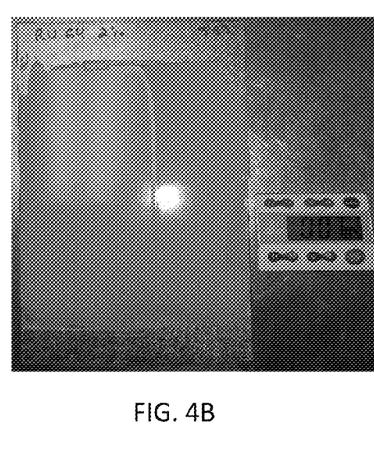
Figure 4C:
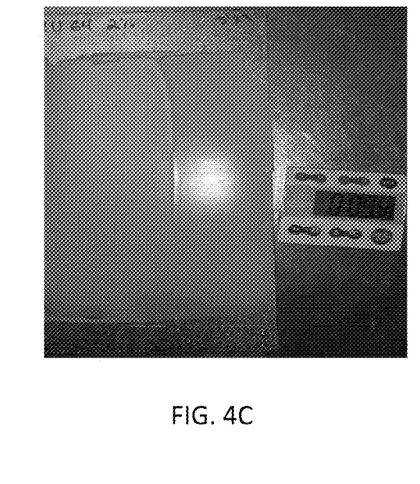
Figure 4D:
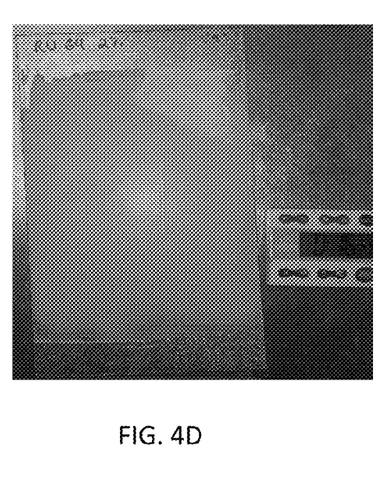

FIGS. 4A-4D are photographs of a silicon bronze panel with a polyester based filler composition of Example 1, RU 64 containing a free-radical fading red dye mixed with 2 total weight percent BPO with the temperature held at 20° C. as a function of time: 2'31 min (FIG. 4A), 7'05 min (FIG. 4B), 9'38 min (FIG. 4C), and 16'30 min (FIG. 4D). The starting purple color of FIG. 4A then transitions to a more purple color seen in FIG. 4B. At 9'38 (FIG. 4C), the pink almost completely faded except the furthest edges. The last photo is at about 16.5 minutes (FIG. 4D) and shows there is very little change between 9-9.5 minutes and the 16.5 minutes, except on edges. The filler was sanded at 16.5 minutes with no clog; no pink edges at that time. These data show that color change of the cure reactive red dye correlates with cure of filler and correctly indicates dry to sand time under different cure conditions.

Example 5

Effect of Resin Cure Rate and Cure Initiator Loading

Figure 5A:
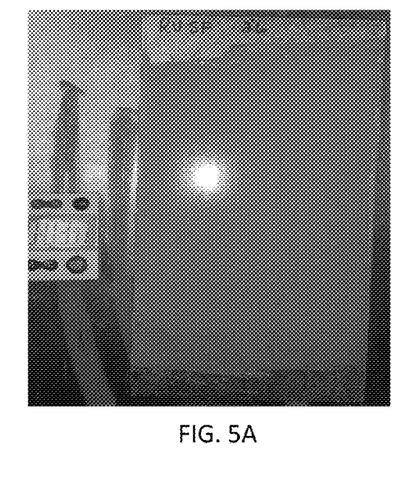
FIGS. 5A-5D are photographs of a silicon bronze panel with a polyester based filler composition that is a slower cure filler relative to RU 64 containing a free-radical fading red dye as part A mixed with 2 total weight percent BPO with the temperature held at 20° C. as a function of time: 3'31 min (FIG. 5A), 7'08 min (FIG. 5B), 14'38 min (FIG. 5C), and 17'30 min (FIG. 5D).
Figure 5B:
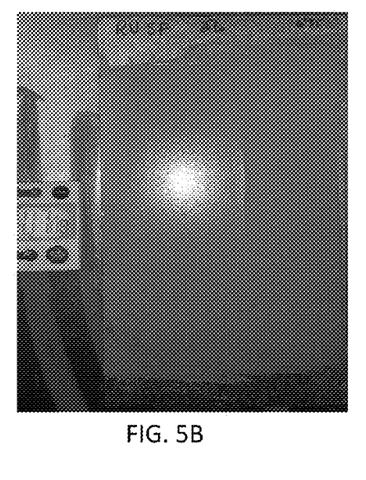
Figure 5C:
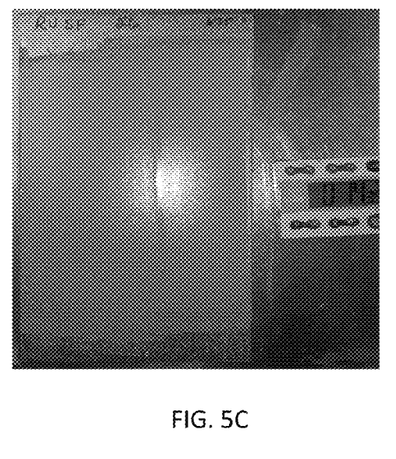
Figure 5D:
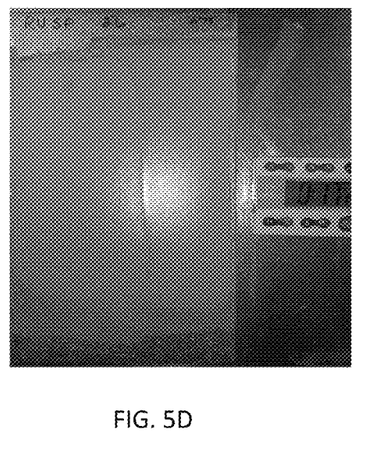

FIGS. 5A-5D are photographs of a silicon bronze panel with a polyester based filler composition that is a slower cure filler relative to RU 64 containing a free-radical fading red dye mixed with 2 total weight percent BPO with the temperature held at 20° C. as a function of time: 3'31 min (FIG. 5A), 7'08 min (FIG. 5B), 14'38 min (FIG. 5C), and 17'30 min (FIG. 5D).

The same color transition can be seen in the formulation of EXAMPLE 3 relative to EXAMPLE 1, but at different times at 2 total weight percent BPO. The more purple color begins to develop at about 14 minutes. At about 17 minutes the color change is mostly complete, except on edges. The filler was sanded at 19.5 minutes with no clog; no pink edges at that time.

FIGS. 6A-6D are photographs of a silicon bronze panel with a polyester based filler composition shown in FIGS.

Figure 6A:
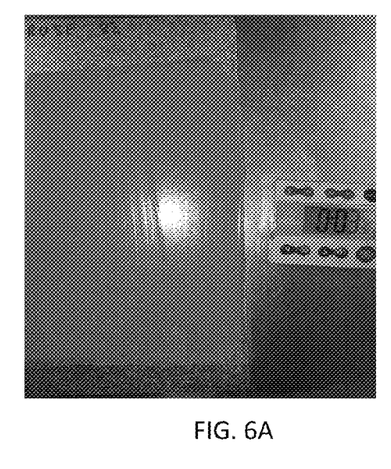
FIGS. 6A-6D are photographs of a silicon bronze panel with a polyester based filler composition shown in FIGS. 5A-5D and containing a free-radical fading red dye as part A mixed with 3 total weight percent BPO as part B with the temperature held at 20° C. as a function of time: 3'36 min (FIG. 6A), 6'39 min (FIG. 6B), 9'25 min (FIG. 6C), and 12'18 min (FIG. 6D).
Figure 6B:
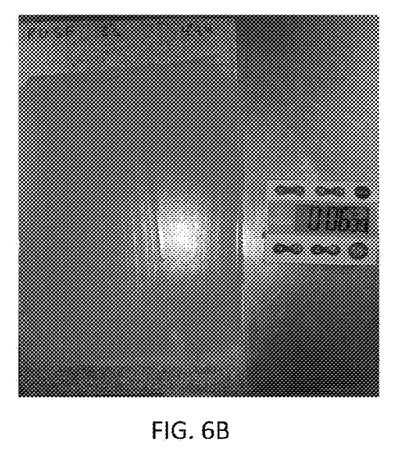
Figure 6C:
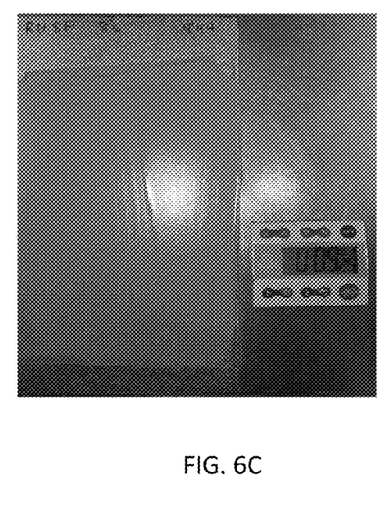
Figure 6D:
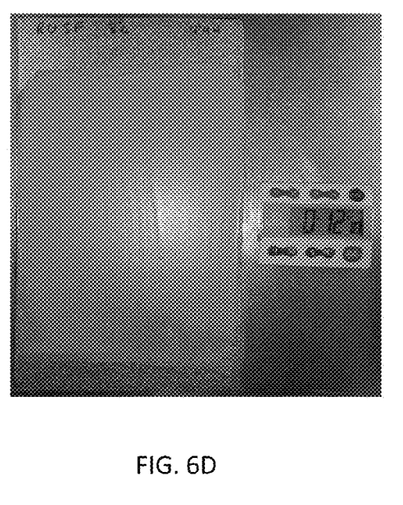

5A-5D and containing a free-radical fading red dye mixed with 3% BPO with the temperature held at 20° C. as a function of time: 3'36 min (FIG. 6A), 6'39 min (FIG. 6B), 9'25 min (FIG. 6C), and 12'18 min (FIG. 6D). The same color transition can be seen in the formulation of EXAMPLE 3 relative to EXAMPLE 1, but at different times at 3 total weight percent BPO that are faster than the same resin loaded with BPO at 2 total weight percent. The more purple color begins to develop at about 10 minutes (FIG. 6C). The color change was basically complete at 12'18, except on edges (FIG. 6D). The filler was sanded at 13.5 minutes with no clog; no pink edges at that time.

Example 6

Change in Color Changing Dye

The color changing dye of EXAMPLE 1 is replaced with 100 ppm Oil Blue A color changing dye. The procedure of EXAMPLE 4 is then repeated with similar results except for an as mixed dark blue color that changes to light blue with complete cure. It is more difficult to see when color change is complete at dry to sand time than with cure reactive red dye (purple to light blue).

TABLE 1

Composition of Fillers Containing Reactive Dyes: Cure reactive red dye and Blue Methylene Blue - Part A

| Chemical | Weight % |
| --- | --- |
| UPE Resin 20-60% unsaturation | 28-35 |
| UPE Resin modified with fatty acids | 7-35 |
| Reactive diluent | 3-5 |
| Cure reactive red dye 2.5% solution | 0.2-0.6 |
| Methylene Blue 3% solution in methanol | 0.1-0.5 |
| Microspheres | 4-7 |
| Rheological: organoclay | 0.2-0.5 |
| Wetting agent: alkylammonium salt of an acidic copolymer | 0-2 |
| Promoter: tertiary amine | 0.03-0.5 |
| Pigment paste | 0.1-1 |
| Inhibitor: reacted benzoquinone | 0.01-0.5 |
| Styrene suppressant: paraffin wax | 0.03-0.05 |
| Moisture scavenger: aliphatic anhydride | 0-0.8 |
| Fillers/pigments | Remainder such as: |
| Pigment: $TiO_2$ | 0-6.0 |
| Calcium carbonate: 0.5-15 micron | 0-40.0 |
| Talc 1: 0.5-10.0 micron | 0-10.0 |
| Talc 2: 10-20 micron | 0-40.0 |

Example 7

Compounding of Third Inventive Formulation 80 ppm of cure reactive red dye and 40 ppm of blue reactive dye methylene blue are admixed into the part A, resulting in purple color. Part B contains 50 weight percent BPO and small amount of not reactive blue dye to show mixing with Part A. Part B is added to Part A in the amount 2 or 3 total weight percent based on Part A. As a result, after initial mixing of parts A and B, the color is purple with a color change occurring thereby indicating a dry to sand time condition has been reached. Methylene blue forms a blue layer on the surface, which serves as guide coat.

Example 8

Compounding of Sixth Inventive Formulation

The process of Example 1 is repeated with SF resin in place of RU 64. SF is slower than RU 64 body filler, under like cure conditions, it takes 30% more time to complete color change and cure, compared to RU 64 body filler, but otherwise behaves the same.

Comparative Example A

The base polyester resin formulation of EXAMPLE 1 is tested as a conventional comparative. A residual blue color is noted before and after cure and associated with a blue nonreactive colorant present in the part B.

Figure 7A:
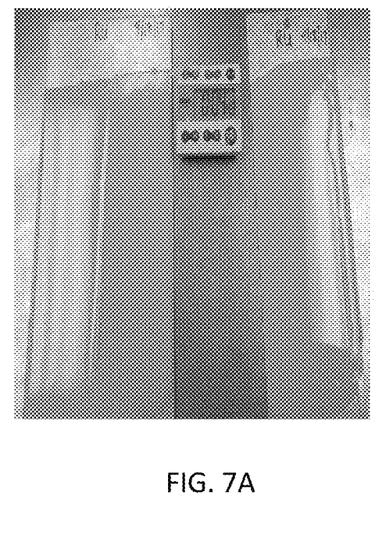
FIGS. 7A-7C are photographs of RU 64 filler without the inventive cure reactive red dye as part A catalyzed with 2 total weight percent BPO (Comparative control) containing unreactive blue filler pigment on two different substrates in each photograph with silicon bronze (left) and galvanized steel (right) the temperature held at 20° C. as a function of time: 4'49 min (FIG. 7A), 6'07 min (FIG. 7B), and 14'07 min (FIG. 7C).
Figure 7B:
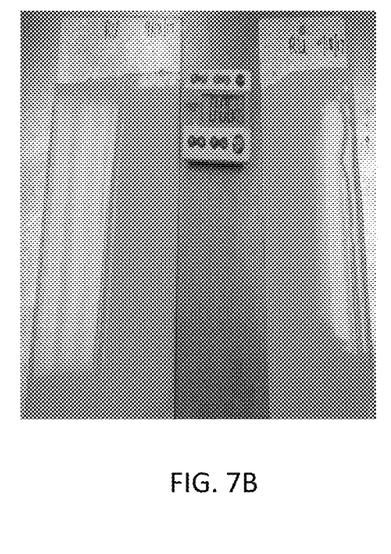
Figure 7C:
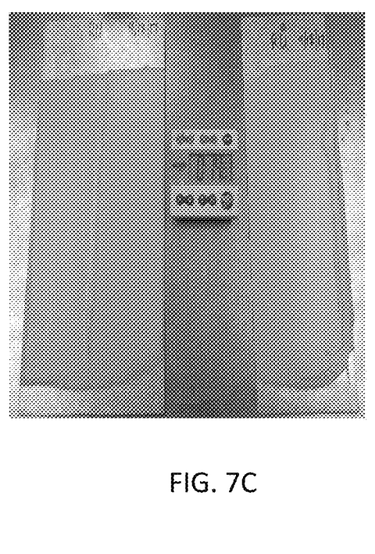

FIGS. 7A-7C are photographs of RU 64 filler without the inventive cure reactive color changing red dye catalyzed with 2 total weight percent unreactive blue dye containing BPO (Comparative control) on two different substrates in each photograph with silicon bronze (left) and galvanized steel (right) the temperature held at 20° C. as a function of time: 4'49 min (FIG. 7A), 6'07 min (FIG. 6B), and 14'07 min (FIG. 7C).

Example 9

Effect of Cure Reactive Dye with Guide Coat Colorant

Figure 8A:
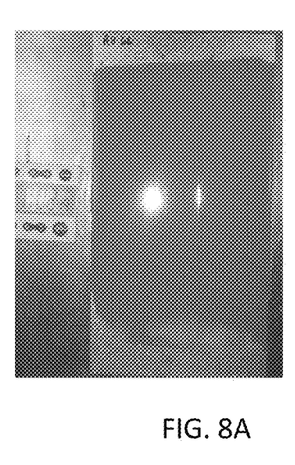
FIGS. 8A-8E are photographs of a silicon bronze panel with a polyester based filler composition, denoted as RU 66 containing a 80 ppm of free-radical fading red dye and 40 ppm methylene blue, as an ambient air reactive guide coat colorant, as part A mixed with 2 total weight percent fully formulated benzoyl peroxide cure initiator (BPO) as part B, the temperature held at 20° C. as a function of time: 2'49 min (FIG. 8A), 3'49 min (FIG. 8B), 5'22 min (FIG. 8C), 8'33 min (FIG. 8D), and 14'14 min (FIG. 8E). An initial purple color changes to blue as the red colored dye goes from pink to colorless, indicating dry to sand time. Air exposed methylene blue forms blue thin layer on the surface, which serves as guide coat, while methylene blue in newly sanded regions is colorless.
Figure 8B:
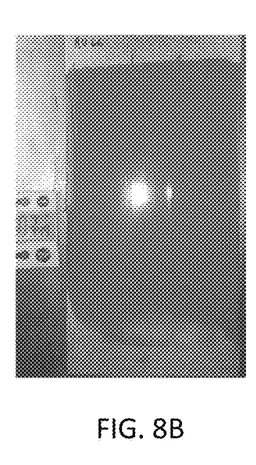
Figure 8C:
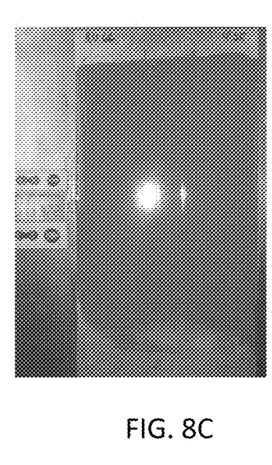
Figure 8D:
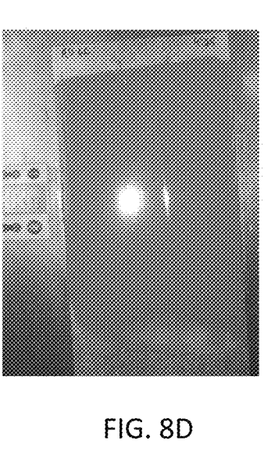
Figure 8E:
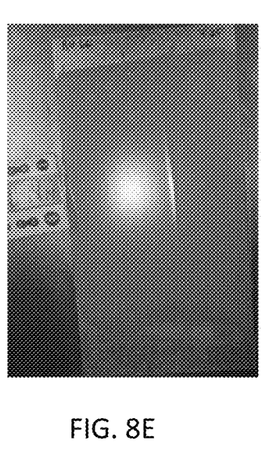

The formulation of Example 9 is applied to bronze substrates at a thickness of 0.5-1.0 mm and cure is monitored for color change as a function time. FIGS. 8A-8E are photographs of the silicon bronze panels curing at 20° C.: 2'49 min (FIG. 8A), 3'49 min (FIG. 8B), 5'22 min (FIG. 8C), 8'33 min (FIG. 8D), and 14'14 min (FIG. 8E).

Figure 9A:
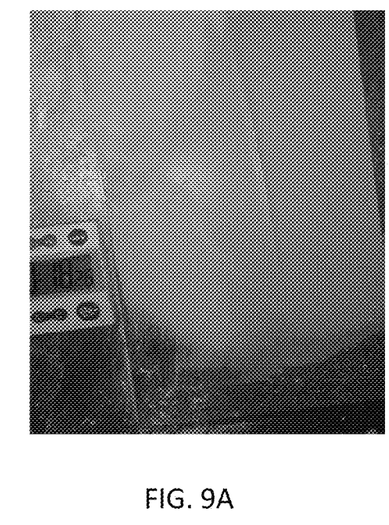
FIGS. 9A-9C are photographs of RU 64 filler on silicon bronze with the inventive cure reactive red dye catalyzed with 2 total weight percent BPO (FIG. 9A) containing unreactive blue pigment, with the same red dye of FIG. 9A and 40 ppm methylene blue (FIG. 9B), and the same composition of FIG. 9B curing to show low spots on the surface as blue spots.
Figure 9B:
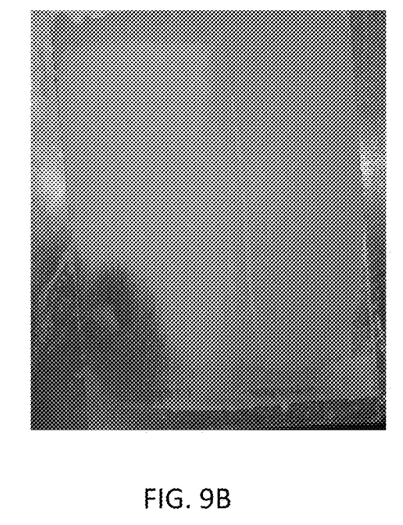
Figure 9C:
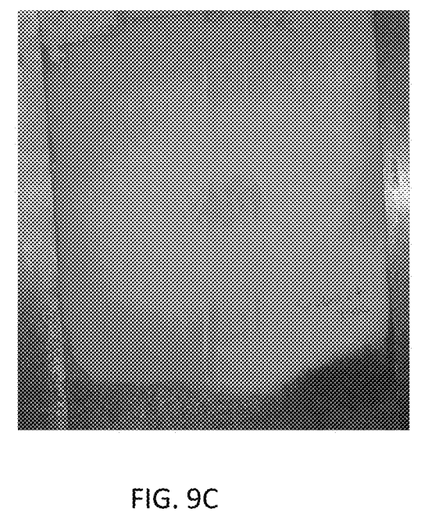

FIGS. 9A-9C are photographs of the Example 9 formulation on silicon bronze catalyzed with 2 total weight percent unreactive blue dye containing BPO (FIG. 9A), with the same red dye of FIG. 9A and 40 ppm methylene blue (FIG. 9B), and the same composition of FIG. 9B curing to show low spots and need for more sanding.

Figure 10A:
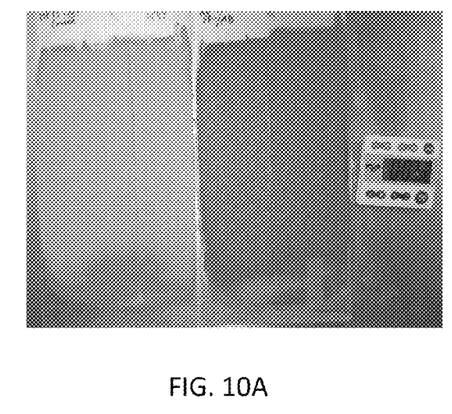
FIGS. 10A-10D are photographs of RU 64 filler without the inventive cure as a comparative control and 80 ppm reactive red dye catalyzed and 40 ppm methylene blue, both with 2 total weight percent BPO (Comparative control) containing unreactive blue pigment on galvanized steel substrates in each photograph, the temperature held at 20° C. as a function of time: 3'55 min (FIG. 10A), 9'18 min (FIG. 10B), 12'47 min (FIG. 10C) and 18'31 min (FIG. 10D). The control does not change color while filler with dyes changes from purple to blue at dry to sand time.
Figure 10B:
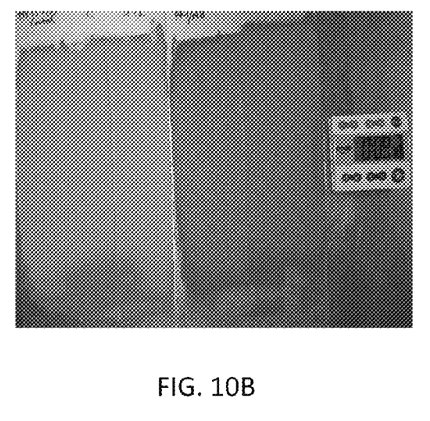
Figure 10C:
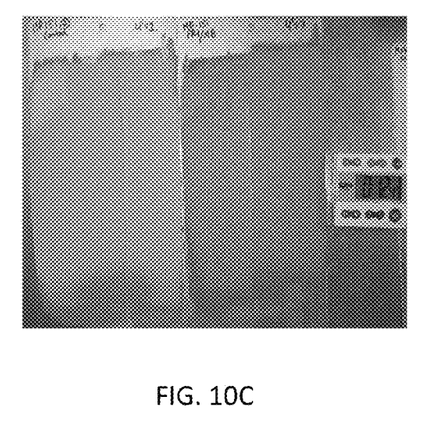
Figure 10D:
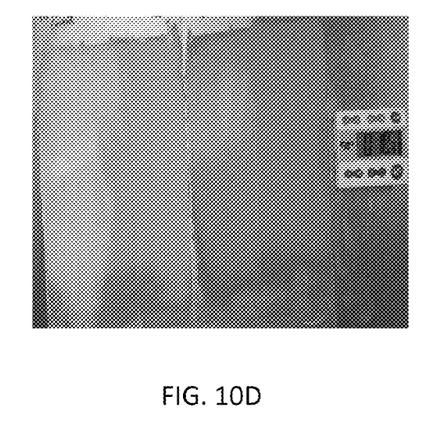

FIGS. 10A-10D are photographs of a cure reactive dye-free version of Example 9 as a comparative control, and the Example 9 formulation are applied side-by-side on galvanized steel substrates in each photograph, the temperature held at 20° C. as a function of time: 3'55 min (FIG. 10A), 9'18 min (FIG. 10B), 12'47 min (FIG. 10C) and 18'31 min (FIG. 10D). The control does not change color while filler with dyes changes from purple to blue at dry to sand time.

Figure 11A:
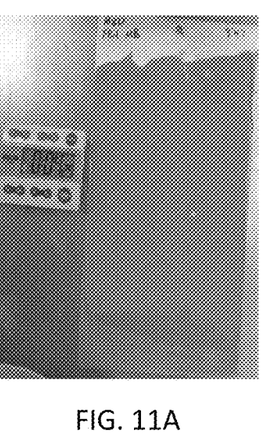
FIGS. 11A-11E are photographs of a galvanized steel panel with a polyester based filler composition, RU 66 containing a 80 ppm of free-radical fading red dye and 40 ppm methylene blue mixed with 2 total weight percent benzoyl peroxide cure initiator (BPO) the temperature held at 20° C. as a function of time: 4'29 min (FIG. 11A), 5'33 min (FIG. 11B), 7'36 min (FIG. 11C), 14'01 min (FIG. 11D), and 20'50 min (FIG. 11E). A color change is noted as the formulations cures.
Figure 11B:
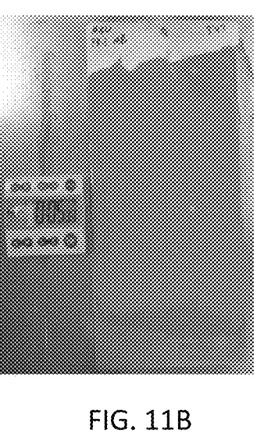
Figure 11C:
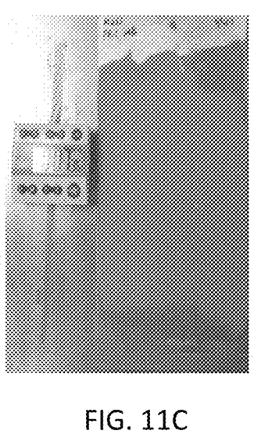
Figure 11D:
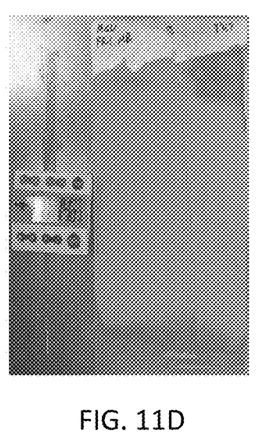
Figure 11E:
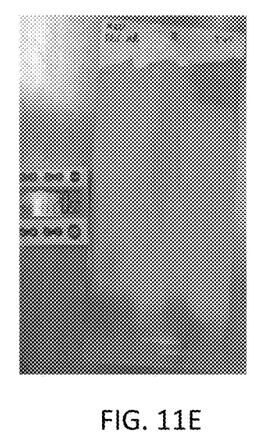

FIGS. 11A-11E are photographs of a galvanized steel panel with the Example 7 formulation at 20° C. as a function of time: 4'29 min (FIG. 11A), 5'33 min (FIG. 11B), 7'36 min (FIG. 11C), 14'01 min (FIG. 11D), and 20'50 min (FIG. 11E). A color change is noted as the formulations cures.

Figure 12A:
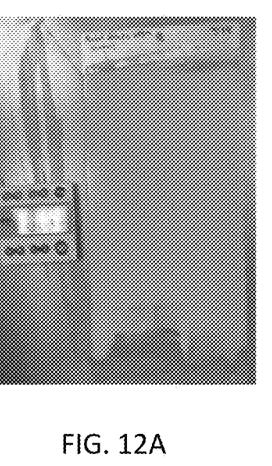
FIGS. 12A-12E are photographs of a galvanized steel panel with a polyester based filler composition, RU 66 containing no cure changing dyes with 2 total weight percent benzoyl peroxide cure initiator (BPO) the temperature held at 20° C. as a function of time and as a comparative control relative to FIGS. 11A-11E: about 4'15 min (FIG. 12A), about 5'30 min (FIG. 12B), 8'42 min (FIG. 12C), 13'52 min (FIG. 12D), and 23'52 min (FIG. 12E). No color change is noted as the formulations cures.
Figure 12B:
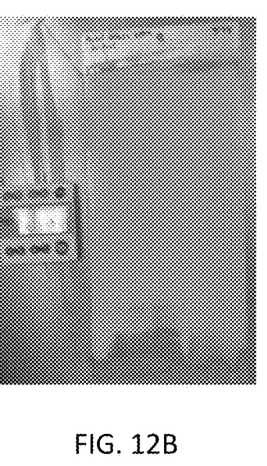
Figure 12C:
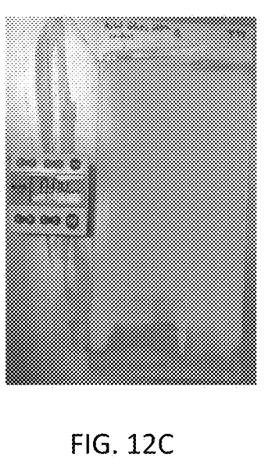
Figure 12D:
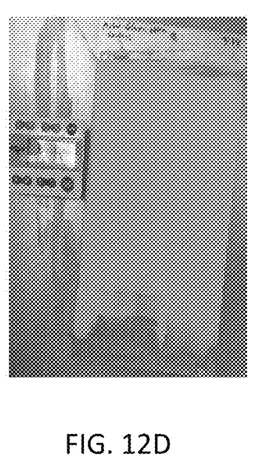
Figure 12E:
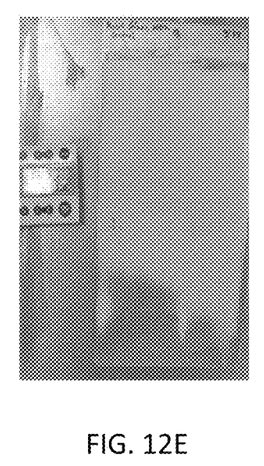

FIGS. 12A-12E are photographs of a reactive dye-free formulation otherwise identical to the Example 9 formulation cured at 20° C. as a function of time and as a comparative control relative to FIGS. 11A-11E: about 4'15 min (FIG. 12A), about 5'30 min (FIG. 12B), 8'42 min (FIG. 12C), 13'52 min (FIG. 12D), and 23'52 min (FIG. 12E). No color change is noted as the formulations cures.

As a person skilled in the art will recognize from the previous detailed description and from the figures and claims, modifications and changes can be made to the preferred embodiments of the invention without departing from the scope of this invention defined in the following claims.

The invention claimed is:

1. A vehicle bond filler formulation comprising:
a part A comprising a curable resin having a degree of unsaturation; and a monomer reactive diluent in which said curable resin is dissolved or suspended, wherein the monomer reactive diluent is an acrylic, acrylate, methacrylate, ether monomer of the structure ($C_1$-$C_6$ alkyl)-O—($C_2$-$C_6$ alkylene), styrene, α-methylstyrene, vinyl toluene, di-functional styrene, allyl substituted benzene, di-vinyl benzene, difunctional acrylate, tri-functional acrylate, acrylonitrile, mono-vinyl-terminated polydimethylsiloxane, and combinations thereof;
a part B storage-separate, free-radical cure initiator package comprising a free-radical cure initiator; and
one or more color changing dye present from 0.0005 to 0.002 total weight percent of a combination of said part A and said part B, said one or more color changing dye is present in either said part A or said part B, said one or more color changing dye are adapted to change color upon mixing of said part A and said part B, where a terminal color change occurs with respect to said color changing dye within ±5 minutes of cure of said curable resin to a sandable condition or said terminal color change occurs in the form of a guide coat colorant reactive with ambient air or light or a combination thereof.

2. The formulation of claim 1 further comprising a part C, wherein said one or more color changing dye is present in either said part A or said part C, but not in said part B.

3. The formulation of claim 1 wherein said one or more color changing dye is at least two color changing dyes.

4. The formulation of claim 1 wherein said curable resin is a polyester.

5. The formulation of claim 1 wherein said one or more color changing dye has a formula A-X-A' where A and A' are each independently an aryl moiety $C_6H_5$—, $C_{10}H_7$—, $C_5NH_4$—, $C_4NH_4$—, $C_4N_2H_3$— and substituted forms thereof in which any given hydrogen is substituted by a $C_1$-$C_4$ alkyl, $C_1$-$C_4$ alkyl primary amine, $C_0$-$C_4$ alkyl phenyl, $C_0$-$C_4$ alkyl hydroxyl, $C_1$-$C_4$ alkyl ester, $C_0$-$C_4$ alkyl sulfonate, or a combination thereof, and wherein X is N═N, C═C, C(O), C(N—H).

6. The formulation of claim 5 wherein X is N═N.

7. The formulation of claim 1 wherein said one or more color changing dye is two color changing dyes, each of said two color changing dyes are a different color prior to cure and being colorless as the terminal color change to an unaided normal human eye after cure.

8. The formulation of claim 1 wherein said free-radical cure initiator is a peroxide.

9. The formulation of claim 8 wherein said peroxide is benzoyl peroxide.

10. The formulation of claim 1 wherein one color changing dye of said one or more color changing dye is red prior to cure.

11. The formulation of claim 1 wherein said one or more color changing dye is a first color when in an oxidized state and is the terminal color of a different color when in a reduced state.

12. The formulation of claim 1 wherein one of said one or more color changing dyes is blue prior to cure.

13. A process for repairing a vehicle body comprising:
mixing a polyester resin formulation part A comprising: a curable resin having a degree of unsaturation, a monomer reactive diluent in which said curable resin is dissolved or suspended, wherein the monomer reactive diluent is an acrylic, acrylate, methacrylate, ether monomer of the structure ($C_1$-$C_6$ alkyl)-O—($C_2$-$C_6$ alkylene), styrene, α-methylstyrene, vinyl toluene, di-functional styrene, allyl substituted benzene, di-vinyl benzene, difunctional acrylate, trifunctional acrylate, acrylonitrile, mono-vinyl-terminated polydimethylsiloxane, and combinations thereof, and one or more color changing dye present and adapted to change color upon mixing of said part A and said part B, a terminal color change occurring within ±5 minutes of cure of said curable resin to a sandable condition or a guide coat colorant reactive with ambient air or light or a combination thereof; with a part B storage-separate free-radical cure initiator package comprising a free-radical cure initiator to form a mixture;
applying said mixture to a substrate of the vehicle body in need of repair; and
curing said mixture to form a fill to repair the vehicle body under conditions adapted to cause said one or more color changing dye to the terminal change color within ±5 minutes of cure of said curable resin to a sandable.

14. The process of claim 13 wherein said curing occurs within 20 minutes of forming said mixture.

15. The process of claim 13 further comprising sanding said fill.

16. The process of claim 15 wherein said guide coat colorant is present and revealing low spots on the vehicle body in which said guide coat colorant color change has occurred and not been removed by the sanding.

17. The process of claim 15 further comprising confirming that no low spots remain on the vehicle body by sanding said fill until no surface color remains visible to said unaided, normal human eye.

18. The process of claim 13 wherein said fill has a feature edge and a central region.

19. The process of claim 13 where the terminal color change of said one or more color changing dye is observed with an unaided normal human eye, or software operating on a computations device and analyzing a color photograph of said fill.

* * * * *